United States Patent [19]
Correa

[11] Patent Number: 5,619,718
[45] Date of Patent: Apr. 8, 1997

[54] ASSOCIATIVE MEMORY PROCESSING METHOD FOR NATURAL LANGUAGE PARSING AND PATTERN RECOGNITION

[76] Inventor: Nelson Correa, Carrera 6ª Nº 57-11 Apt. 402, Santa Fe de Bogota, D.C., Colombia

[21] Appl. No.: 557,729

[22] Filed: Nov. 13, 1995

Related U.S. Application Data

[62] Division of Ser. No. 880,711, May 8, 1992, Pat. No. 5,511,213.

[51] Int. Cl.⁶ ................................................. G06F 15/78
[52] U.S. Cl. ........................ 395/800; 395/435; 364/253; 364/DIG. 1
[58] Field of Search .................................. 395/800, 700, 395/435; 364/253, DIG. 1

[56] References Cited

U.S. PATENT DOCUMENTS

| | | | |
|---|---|---|---|
| 4,686,623 | 8/1987 | Wallace | 395/700 |
| 4,914,590 | 4/1990 | Loatman et al. | 364/419.08 |
| 4,994,966 | 2/1991 | Hutchins | 364/419.08 |
| 5,105,353 | 4/1992 | Charles et al. | 395/700 |
| 5,239,298 | 8/1993 | Wei | 341/51 |
| 5,239,663 | 8/1993 | Faudemay et al. | 395/800 |

*Primary Examiner*—Alyssa H. Bowler
*Assistant Examiner*—John Harrity
*Attorney, Agent, or Firm*—Beveridge, DeGrandi, Weilacher & Young, LLP

[57] ABSTRACT

An associative memory processor architecture is disclosed for the fast and efficient execution of parsing algorithms for natural language processing and pattern recognition applications. The architecture consists of an associative memory unit for the storage of parsing state representations, a random access memory unit for the storage of the grammatical rules and other tables according to which the parsing is done, a finite state parsing control unit which embodies the chosen parsing algorithm, and a communications unit for communication with a host processor or external interface. The use of associative memory for the storage of parsing state representations allows the architecture to reduce the algorithmic time complexity of parsing algorithms both with respect to grammar size and input string length, when compared to standard software implementations on general purpose computers. The disclosed architecture provides for a fast and compact computer peripheral or system, particularly when physically realized in one or a small number of integrated circuit chips, and thus contributes to the technical feasibility, of real time applications in speech recognition, machine translation, and syntactic pattern recognition.

4 Claims, 5 Drawing Sheets

FIG. 3
| NUMBER | RULE |
|---|---|
| 0 | Z → S $ |
| 1 | S → NP VP |
| 2 | NP → "JOHN" |
| 3 | VP → "THINKS" |
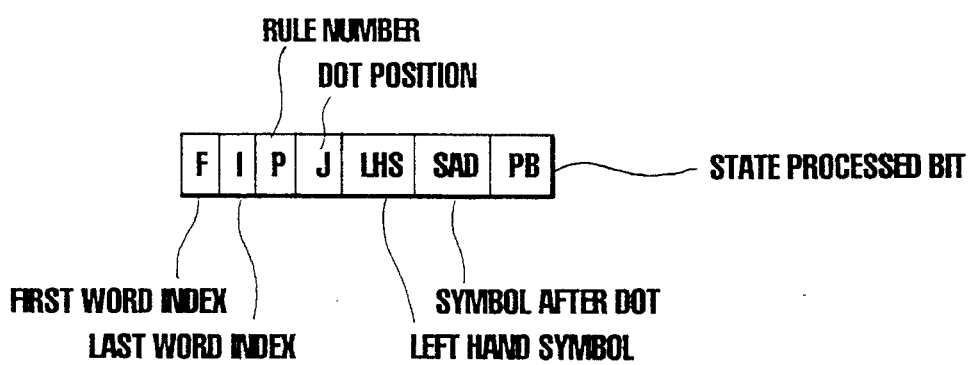
FIG. 5
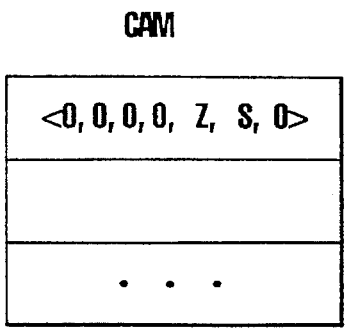
FIG. 7A
CAM
<0, 0, 0, 0, Z, S, 0>
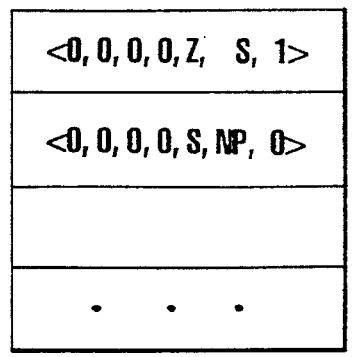
FIG. 7B
CAM
<0, 0, 0, 0, Z, S, 1>
<0, 0, 0, 0, S, NP, 0>

FIG. 7C

"JOHN THINKS $"

| CAM | ITEMS | ACTION |
|---|---|---|
| <0, 0, 0, 0, Z, S, 1> | Z ----- •S"$" | PREDICT |
| <0, 0, 1, 0, S, NP, 1> | S ----- •NP VP | PREDICT |
| <0, 0, 2, 0, NP, "JOHN", 1> | NP ----- •"JOHN" | EXAMINE |
| <0, 1, 2, 1, NP, NIL, 1> | NP ----- "JOHN"• | COMPLETE |
| <0, 1, 1, 1, S, VP, 1> | S ----- NP • VP | PREDICT |
| <1, 1, 3, 0, VP, "THINKS", 1> | VP ----- • "THINKS" | EXAMINE |
| <1, 2, 3, 1, VP, NIL, 1> | VP -----"THINKS"• | COMPLETE |
| <0, 2, 1, 2, S, NIL, 1> | S ----- NP VP• | COMPLETE |
| <0, 2, 0, 1, Z, "$", 1> | Z ----- S • "$" | EXAMINE |
| <0, 3, 0, 2, Z, NIL, 1> | Z ----- S "$" • | ACCEPT |

ASSOCIATIVE MEMORY PROCESSING METHOD FOR NATURAL LANGUAGE PARSING AND PATTERN RECOGNITION

This is a divisional of allowed application Ser. No. 07/880,711, filed on May 8, 1992, now U.S. Pat. No. 5,511,213.

BACKGROUND OF THE INVENTION

The present invention relates broadly to computer hardware architectures using parallel processing techniques and very large scale integration (VLSI) microelectronic implementations of them. More particularly, the invention relates to an integrated associative memory processor architecture for the fast and efficient execution of parsing algorithms used in parsing intensive and real time natural language processing and pattern recognition applications, including speech recognition, machine translation, and natural language interfaces to information systems.

Parsing is a technique for the analysis of speech, text, and other patterns, widely used as a key process in contemporary natural language processing systems and in syntactic pattern recognition for the identification of sentence structure and ultimately the semantic content of sentences. Parsing is done with respect to a fixed set of rules that describe the grammatical structure of a language. Such a set of rules is called a grammar for the language. In a standard parsing model, the parser accepts a string of words from its input and verifies that the string can be generated by the grammar for the language, according to its rules. In such case the string is said to be recognized and is called a sentence of the language.

There exist many forms of grammar that have been used for the description of natural languages and patterns, each with its own generative capacity and level of descriptive adequacy for the grammatical description given languages. A hierarchy of grammars has been proposed by N. Chomsky, "On Certain Formal Properties of Grammar," Information and Control, Vol. 2, 1959, p. 137–167, and some of the formalisms that have been or are currently in use for the description of natural language are transformational grammar, two-level grammar, unification grammar, generalized attribute grammar, and augmented transition network grammar. Nonetheless, the formalism most widely used is that of context-free grammars; the formalisms just cited, and others, are in some sense augmentations of or based on context-free grammars.

Likewise, many parsing methods have been reported in the literature for the parsing of natural languages and syntactic pattern recognition. For context-free grammars there are three basic parsing methods, as may be inspected in "The Theory of Parsing, Translation and Compiling," Vol. 1, A. V. Aho and J. D. Ullman, 1972. The universal parsing methods, represented by the Cocke-Kasami-Younger algorithm and Earley's algorithm, do not impose any restriction on the properties of the analysis grammar and attempt to produce all derivations of the input string. The two other methods, known as top-down or bottom-up, attempt as their names indicate to construct derivations for the input string from the start symbol of the grammar towards the input words, or from the input words towards the start symbol of the grammar. The parsing state representations used by the parsing methods include, in general, a triple consisting of the first and last word positions in the input string covered by the parsing state, and a parsing item which may be a grammatical category symbol or a "dotted" grammatical rule, that shows how much of the item has been recognized in the segment of the input swing marked by the first and last word positions.

In contrast to the parsing of some artificial languages, such as programming languages for computers, the chief problems encountered in parsing natural languages are due to the size of the grammatical descriptions required, the size of the vocabularies of said languages and several sons of ambiguity such as part of speech, phrase structure, or meaning found in most sentences. The handling of ambiguity in the description of natural language is by far one of the most severe problems encountered and requires the adoption of underlying grammatical formalisms such as general context-free grammars and the adoption of universal parsing methods for processing.

Even the most efficient universal parsing methods known for context-free grammars (Cocke-Kasami-Younger and Earley's algorithms) are too inefficient for use on general purpose computers due to the amount of time and computer resources they take in analyzing an input string, imposing serious limitations on the size of: the grammatical descriptions allowed and the types of sentences that may be handled. The universal parsing methods produce a number of parsing state representations which is in the worst case proportional to the size of the grammatical description of the language and proportional to the square of the number of input words in the string being analyzed. The set of parsing states actually generated in typical applications is, however, a sparse subset of the potential set. Other universal parsing methods used in some systems, including chart parsers, augmented transition network parsers, and top-down or bottom-up backtracking or parallel parsers encounter problems similar to or worse than the standard parsing methods already cited. Since parsing algorithms in current an are typically executed on general purpose computers with a von Neumann architecture, the number of steps required for the execution of these algorithms while analyzing an input sentence can be as high as proportional to the cube of the size of the grammatical description of the language and proportional to the cube of the number of words in the input string.

The existing von Neumann computer architecture is constituted by a random access memory device (RAM) which may be accessed by location for the storage of program and data, a central processing unit (CPU) for fetching, decoding and execution of instructions from the RAM, and a communications bus between the CPU and RAM, comprising address, control, and data lines. Due to its architecture, the von Neumann type computer is restricted to serial operation, executing one instruction on one data item at a time, the communications bus often acting as a "bottleneck" on the speed of the serial operation.

With a clever choice of data structure for the representation of sets of parsing states on a von Neumann computer, such as the use of an array of boolean quantities used to mark the presence or absence of a given item from the set of parsing states, it is possible to reduce the number of steps required to perform basic operations on a set of parsing states to a time that is proportional only to the logarithm of the number of states in the set, and therefore to reduce the total time required for the execution parsing algorithms on the von Neumann computer. However, the number of parsing states that may be generated by universal parsing algorithms is dependent on grammar size and input string length and can be quite high. For the type of grammars and inputs envisioned in language and pattern recognition applications, this number can be of the order of two to the power of thirty, or several thousands of millions of parsing items. This amount of memory space is beyond the capabilities of current computers and, where available, it would be inefficiently used. The speedup technique suggested is well known and illustrates the tradeoff of processing memory space for reduction of execution time. Universal parsing algorithms, furthermore, require multiple patterns of access to their parsing state representations. This defeats the purpose of special data structures as above, unless additional memory space is traded off for a fast execution time.

In the technical article "Parallel Parsing Algorithms and VLSI Implementations for Syntactic Pattern Recognition," Y. T. Chiang and K. S. Fu, IEEE Transactions on Pattern Analysis and Machine Intelligence, Vol. 6, No. 3, 1984, p. 302–314, a parallel processing architecture consisting of a triangular-shaped VLSI systolic army is devised for the execution of a variant of the universal parsing algorithm due to Earley. In the Chiang-Fu architecture, the systolic array has a number of rows and a number of columns equal to the number of symbols in the string to be analyzed. Each processing cell of the systolic array is assigned to compute one matrix element of the representation matrix computed by the algorithm. Each cell is a complex VLSI circuit that includes a control and data paths to implement the operators used in the parsing algorithm, and storage cells for the storage of cell data corresponding to matrix elements. The architecture has a regular communication geometry, with each cell communicating information only to its upper and right-hand side neighbors. In order to achieve its processing efficiency requirements, allowing as many processing cells of the array as possible to operate in parallel, the Chiang-Fu architecture must use a weakened form of Earley's algorithm. Furthermore, in order to meet the VLSI design requirement that each processor perform a constant time operation, the architecture restricts the grammar to be free of null productions, i.e., those whose right-hand sides have exactly zero symbols.

In addition to the two disadvantages of the Chiang-Fu architecture noted above, its main disadvantage, however, is the complexity of each cell in the processing array and the required size of the array. The cell design uses complex special purpose hardware devices such as programmable logic arrays, shift registers, arithmetic units, and memories. This approach yields the fastest execution speed for each cell, but due to its complexity and the highly irregular pattern of interconnections between the cell's components the design is not the best suited for VLSI implementation. Since the systolic array has a number of rows and a number of columns equal to the number of symbols in the string to be analyzed, the number of cells in the array is proportional to the square of the number of symbols in the string.

Associative processing is a technique of parallel computation that seeks to remove some problems of the von Neumann computer by decentralizing the computing resources and allowing the execution of one operation on multiple data items at a time. An associative memory processor has distributed computation resources in its memory, such that the same operation may be executed simultaneously on multiple data items, in situ. The operations that may be executed in the memory are fairly simple, usually restricted to comparison of a stored data word against a given search pattern. The distributed computation approach eliminates two major obstacles to computation speed in the von Neumann computer, namely the ability to operate only on one data item at a time, and the need to move the data to be processed to and from memory. Since associative memory is essentially a memory device, it is the best suited type of circuit for large scale VLSI implementation. Associative processing is currently used in some special purpose computations such as address translation in current computer systems, and is especially well suited for symbolic applications such as string searching, data and knowledge base applications, and artificial intelligence computers. In contrast to addressing by location in a random access memory, associative processing is particularly effective when the sets of data elements to be processed are sparse relative to the set of potential values of their properties, and when the data elements are associated with several types of access patterns or keys.

An associative memory processor architecture for parsing algorithms, as has been proposed by N. Correa, "An Associative Memory Architecture for General Context-free Language Recognition," Manuscript, 1990, stores sets of parsing state representations in an associative memory, permitting inspection of the membership of or the search for a given parsing state in a time which is small and constant, independent of the number of state representations generated by the algorithm. Additionally, the parsing method chosen is implemented in a finite state parsing control unit, instead of being programmed an executed by instruction sequences in the central processing unit of a general purpose computer or microprocessor. This allows for a maximally parallel scheduling of the microoperations required by the algorithm, and eliminates the need for instruction fetching and decoding in the general purpose computer. Furthermore, since the associative memory need be dimensioned only for the number of parsing states that may actually be generated by the parsing algorithms, and since the finite state control unit contains only the states and hardware required for the execution of the algorithm, said machine may be fabricated and programmed more compactly and economically with integrated circuit technology.

It is apparent from the above that prior an approaches to the execution of universal parsing algorithms are neither fast enough nor compact enough for the technical and economic feasibility of complex symbolic applications requiring a parsing step, such as real-time voice recognition and understanding, real-time text and voice-to-voice machine translation, massive document processing, and other pattern recognition applications. The general purpose von Neumann computer and other previous proposals for the parallel execution of those algorithms are not fast enough and not compact enough. The associative processing architecture for the execution of universal parsing algorithms herein disclosed has the potential to offer significant speed improvements in the execution of universal parsing algorithms and is furthermore more compact and better suited for large scale VLSI implementation.

SUMMARY OF THE INVENTION

It is therefore an object of the present invention to provide a new and improved parallel processor architecture that executes parsing algorithms faster than the prior an approaches.

It is a further object of the present invention to provide a new and improved parallel processor architecture which is dedicated exclusively to the execution of parsing algorithms and is physically more compact, smaller, and better suited for large scale VLSI implementation than the prior art approaches.

It is still a further object of the present invention to show a particular embodiment of a universal parsing algorithm in said architecture and the method by which this is achieved.

In accordance with the above objects, the present invention is addressed to an associative memory processor architecture consisting of an associative memory unit for the storage of parsing state representations, a random access memory unit for the storage of the grammatical rules and other parsing data and tables according to which the parsing is done, a finite state parsing control unit which embodies the chosen parsing algorithm, and a communications unit for communication with a host processor or external interface.

The associative memory unit (CAM) is used for the storage of parsing state representations, dynamically computed by the parsing algorithm according to the input string and grammar. Each parsing state representation consists of a tuple of a first word index to a position in the input string, a last word index to a position in the input string, a parsing item, a left-hand side symbol field, a next symbol field, a state-not-processed field, and optional fields to store other information related to the parsing process, such as context and lookahead symbols, attributes of the parsing state, and information for parse tree extraction. Each parsing state representation is stored in one logical CAM word, which permits fast and easy inspection of the parsing states already generated by the algorithm. The parsing item in the third field of a parsing state representation may be a grammar symbol or a dotted rule, consisting of a rule number and an index to a position on the right hand side of the rule.

The random access memory unit (RAM) is used for the storage of the grammatical rules according to which the parsing is done. This memory unit is also used to store other parsing data and tables used by the parsing algorithm, as detailed below; alternatively, a second random access memory unit may be used for the storage of such information. Each grammatical rule consists of one left-hand side symbol and a right-hand side of zero or more symbols. Each grammatical rule is stored in one logical RAM record, with one RAM word allocated to store each of the rule's symbols. In this manner, it is possible to retrieve the j-th symbol of the p-th grammatical rule from the j-th word of the p-th record in the RAM. The RAM may be accessed by the communications unit for the purpose of allowing the host processor writing into the RAM the grammatical rules according to which the parsing is done. Alternatively, the RAM may be a read-only memory, which permanently stores a predefined set of grammatical rules and tables.

The finite state parsing control unit (PCU) is connected to the CAM and the RAM and is a finite state machine that embodies the chosen parsing algorithm. The PCU accesses the CAM for the purposes of initializing it, inserting initial or seed parsing states for the parsing process, and requesting parsing states marked unprocessed for processing. When an unprocessed parsing state is retrieved from the CAM, the PCU may access the RAM and may request input symbols from the communications unit for the purpose of generating new parsing states to be added to the CAM, as unprocessed. Each access to the RAM allows the inspection of the grammatical rules, if any, that may be applicable for processing of the current parsing state. The input symbols requested form the communications unit allow verification that the next input symbol is compatible with the current parsing state. When the PCU has generated the number of parsing state sets required by the input string and all parsing states in the CAM are marked processed—i.e., there are no unprocessed states—the PCU performs a test on the contents of the CAM to decide acceptance of the input string, may optionally execute some post-processing operations, as detailed below, signals the communications unit that the parsing of the current input string is complete, and terminates execution. The exact order and the precise nature of the operations performed by the parsing control unit, generically described above, depend on the particular parsing algorithm embodied in the finite state parsing control unit.

The communications unit (CU) is connected to the CAM, RAM, and PCU and is used for communication with a host processor or external interface. The communications unit may be as simple as an interface to a given computer interconnection bus, or as complex as a system that implements a computer communications protocol. The communications unit accesses the RAM for the purpose of allowing the host processor writing into the RAM the grammatical rules according to which the parsing is done. Alternatively, the RAM may be a read-only memory, which permanently stores a predefined set of grammatical rules, in which case the CU need not have access to the RAM. The CU also accesses the finite state control unit for the purposes of initializing it and supplying to it input symbols from the input string to be analyzed. The CU also accesses the CAM at the end of a parsing process for the purpose of reading out and sending to the host processor the parsing state representations and any other information that may be relevant to further processing of the input string. An optional additional function of the communications unit is its ability to issue commands and dam to the RAM, CAM and PCU for the purpose of testing their functionality and correctness of operation.

Preferably, the associative memory unit is formed on a single integrated circuit chip, and the random access memory unit, finite state parsing control unit, and a communications unit are formed together or programmed on a separate integrated circuit controller chip. Alternatively, all system components may be integrated on a single chip, with optional provision for external expansion of the RAM or CAM memories. In either case, the operation of the finite state parsing control unit may allow for the execution of parse extraction algorithms and useless parsing state marking and elimination algorithms, to simplify further processing of the parsing result by the host processor.

BRIEF DESCRIPTION OF THE DRAWINGS

In the detailed description of the preferred embodiment of the invention presented below, reference is made to drawings as presently detailed. The drawings are not necessarily to scale, emphasis being placed instead upon illustrating the principles of construction and operation of the invention.

FIG. 3 is a small example context-free grammar and shows a sample input string with annotated string positions.

FIG. 5 is a schematic illustration of the parsing state encodings to be stored in the associative memory, for the preferred embodiment where the processor embodies Earley's algorithm.

FIGS. 7a–c are a schematic illustration of a series of CAM memory maps of the associative processing system at different times during parsing an input string, according to the example grammar in FIG. 3.

DETAILED DESCRIPTION OF THE PREFERRED EMBODIMENT

Figure 1:
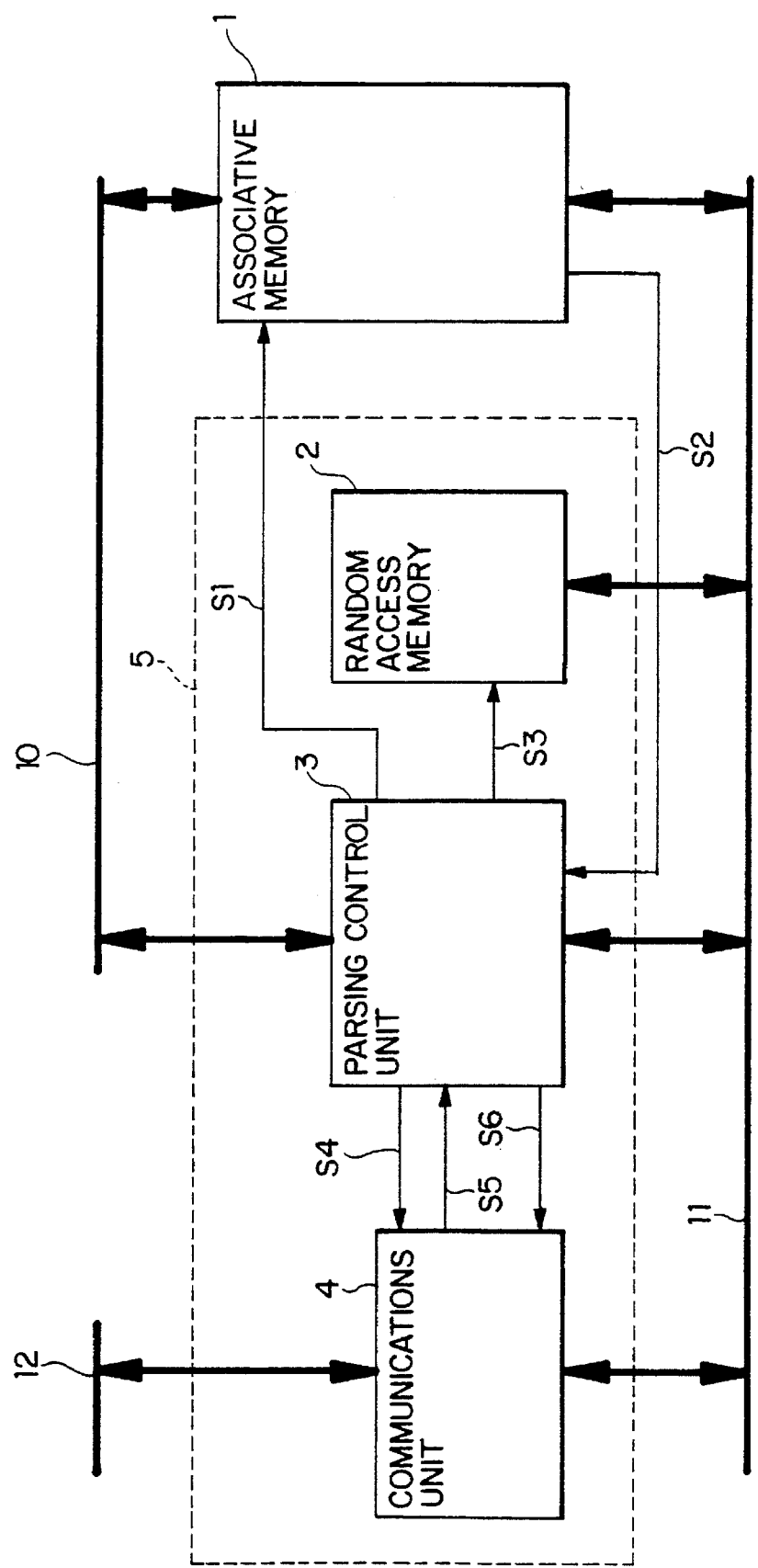
FIG. 1 is a complete schematic illustration of the associative memory processing system for parsing, algorithms, object of the present invention.

FIG. 1 illustrates an embodiment of the present invention suitable for the execution of a wide family of parsing algorithms. Referring to the same figure, the system includes an associative memory unit 1 and a communications and parsing control unit 5. The communications and parsing control unit includes a random access memory unit 2, a finite state parsing control unit 3, a communications unit 4, a first data bus 10, a second data bus 11, and other signals further detailed below.

Associative memory unit 1 is connected by the internal data bus 10 and by control lines S1 and S2 to the parsing control unit. The associative memory unit (CAM) is used for the storage of parsing state representations and its word width is commensurate with the number of bits required for the representation of parsing states. The parsing state representations produced by the parsing control unit may be transferred, i.e., written, to the associative memory through the internal data bus 10. Likewise, parsing states stored in the associative memory may be transferred in the opposite direction, i.e., read, to the parsing control unit by means of the same internal data bus 10. To provide for fast data transfers between the associative memory and the parsing control unit, in one bus cycle, the width of the fast data bus 10 is equal to the width of one CAM word. Control line S1 from the parsing control unit to the associative memory is the operation select code for the operation requested of the associative memory. Control line S2 from the associative memory to the parsing control unit is a match flag produced by the associative memory after a match operation. Because an associative memory is used for the storage of parsing state representations, operations such is the insertion of a new parsing state into the CAM may be performed in constant time, independent of the number of parsing states already generated, and the performance degradation resulting from the use of random access memory in a von Neumann computer for the storage of the same representations is mitigated. Also, because an associative memory is used, multiple access patterns are permitted into the parsing state representations, without the overhead of additional data structures. These multiple access patterns play a role in the implementation of some optimizations of the parsing algorithm to be embedded in the finite state parsing control unit.

Figure 2:
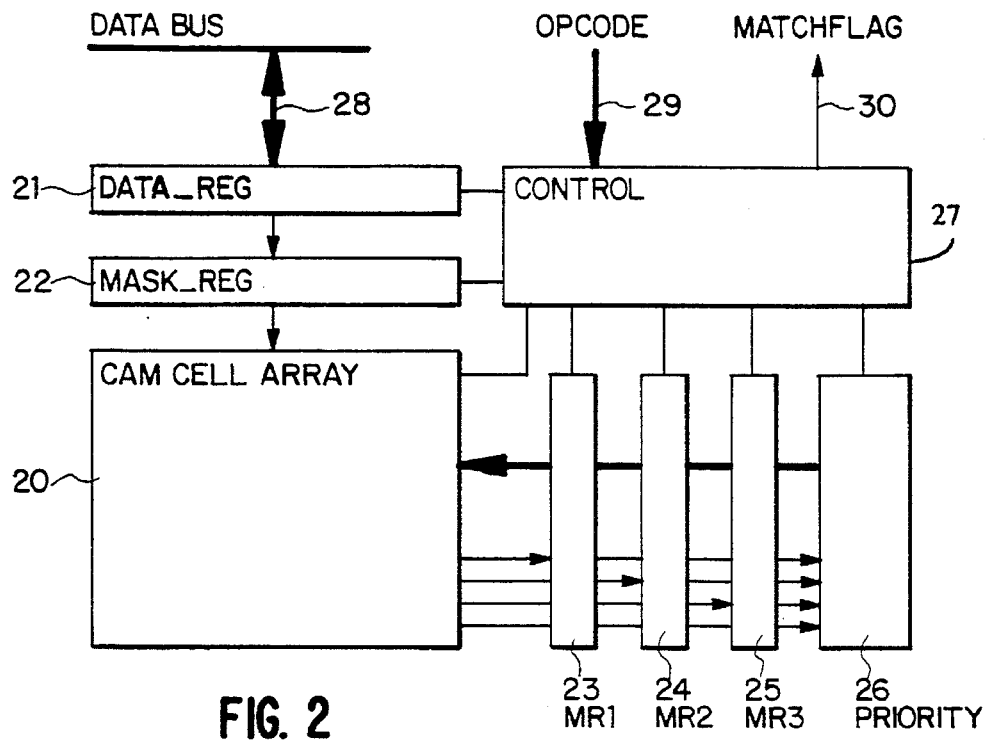
FIG. 2 shows the general organization of the associative memory unit assumed by the preferred embodiment.

The general organization of the associative memory unit assumed by the preferred embodiment is shown in FIG. 2. This device has one array 20 of content addressable memory cells, one data register 21, one mask register 22, three general purpose match registers 23, 24, and 25, a priority encoder 26 for multiple response resolution, and an internal control section 27 for control of CAM operations. The device has an associative method of word selection for read and write operations, in which word selection is achieved by the use of one of the match registers 23, 24, or 25, and the priority encoder 26. The memory receives data and control signals from the outside through data and control buses 28 and 29, and produces one match signal MATCHFLAG 30 after the execution of match operations. The set of operations provided by the associative memory unit is further detailed below in the description of the parsing control unit.

Random access memory unit 2 in FIG. 1 is connected to the parsing control unit and other system components by a second internal data bus 11 and by address and control lines S3 from the PCU. Physically, the RAM is organized as a linear array of words, divided into logical records of several words. The number of bits per RAM word must be selected according to the number of terminal and non-terminal symbols in the grammar, for example, with a word width of ten bits a total of 1024 different symbols may be encoded. We let PLEN be the number of words in one logical RAM record and require that it be at least one more than the number of symbols in the longest grammatical rule to be represented. The grammatical rules are ordered by their left-hand side symbol and numbered from zero to some positive integer PMAX, so that the number of RAM words required to store the grammatical rules is PLEN times PMAX.

Figure 4:
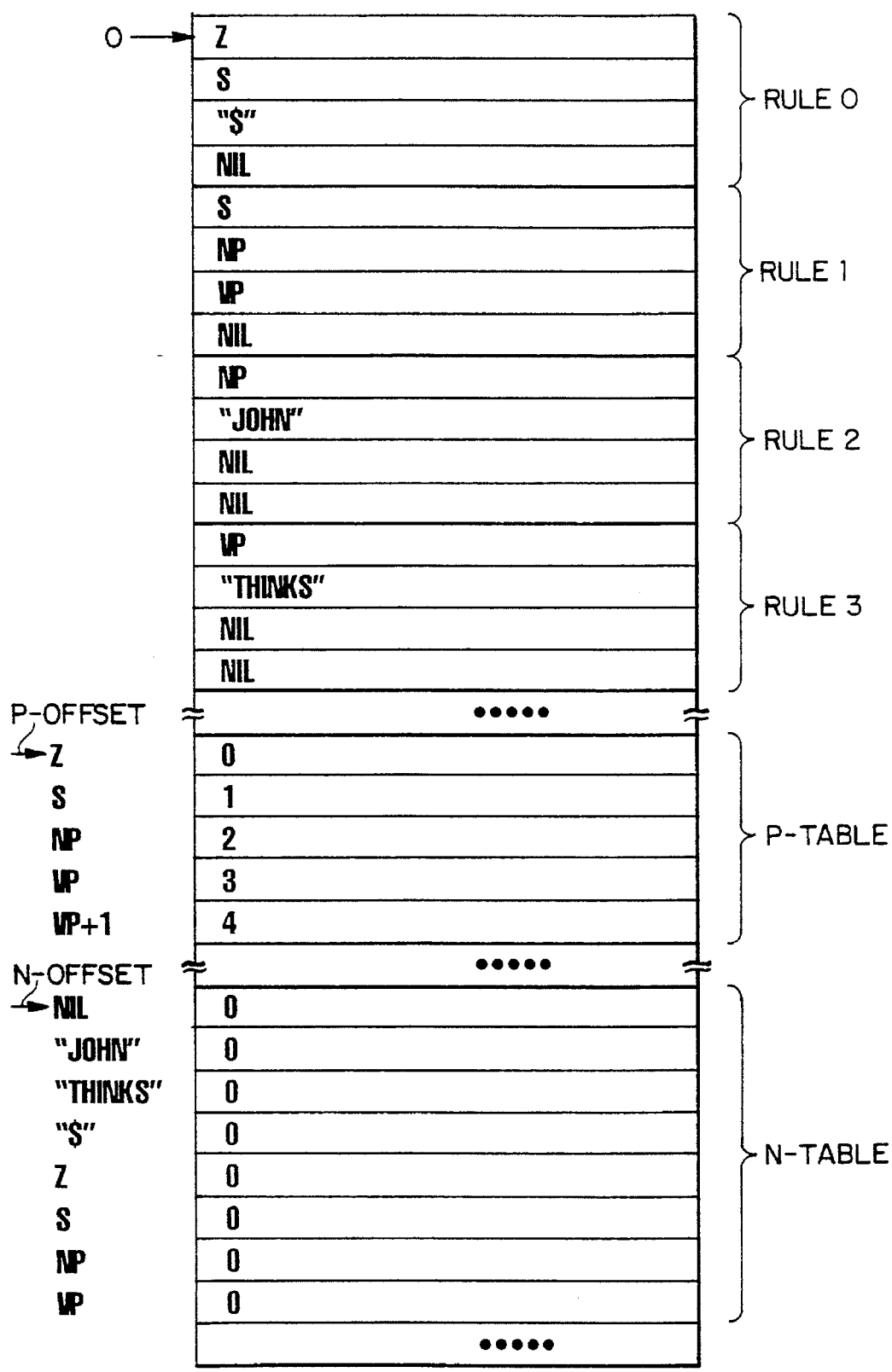
FIG. 4 is a schematic illustration of the RAM memory map corresponding to the example grammar in FIG. 3

The rules of FIG. 3 constitute a simple grammar with four non-terminal symbols Z, S, NP, and VP, and three terminal symbols "$", "John", and "thinks"; Z is the start symbol of the grammar, and "$" is the "end-of-input-string" marker. Each grammatical rule is storm in one logical RAM record, as shown in FIG. 4, with one RAM word used to store each of the rule's symbols. In this preferred embodiment, the logical records have a fixed number of words, such that the j-th symbol of the p-th grammatical rule may be retrieved from the RAM word at address p times PLEN plus j. The symbol NIL, not in the vocabulary of the grammar, is used to mark the end of each rule's fight-hand side. The RAM may be accessed by the communications unit through the second internal data bus 11 for the purpose of allowing the host processor to write into the RAM the grammatical rules according to which the parsing is done. Alternatively, the RAM may be a read-only memory, which permanently stores a predefined set of grammatical rules.

In this embodiment, the random access memory unit contains additional space for the storage of two parsing tables, P-TABLE and N-TABLE. P-TABLE relates the non-terminal symbols of the grammar to the number of the record of the fast production in their list of alternatives in the RAM. This information is used by the parsing algorithm and is stored at an offset P_OFFSET from the first word of the RAM, bevond the end of the space used to store the grammatical rules. N-TABLE is a table of all the symbols in the grammar and the special symbol NIL that indicates for each one whether it may derive the empty string after one or more derivation steps (i.e., whether it may be nulled). This table is stored at an offset N_OFFSET from the fast word of the RAM, bevond the end of the space used to store the P-TABLE. These tables are also shown in FIG. 4.

The parsing control unit 3 in FIG. 1 is connected to the associative memory unit and to the random access memory unit as already described. The parsing control unit is also connected by the second internal data bus 11 and by control lines S4, S5, and S6 to the communications unit. The second internal data bus 11 is used to transfer commands and input symbols to the parsing control unit, and to read status information from the same. Control line S4 is the SYMBOL_REQUEST line from the PCU to the communications unit, while S5 is the SYMBOL_READY line in the converse direction. Control line S6 is the END_OF_PARSE Line from the PCU to the communications unit. Because the parsing control unit is a finite state machine that embodies the chosen parsing algorithm, it is optimized both with regard to speed and size. In this preferred embodiment, the parsing control unit is designed to execute a version of Earley's algorithm, "An Efficient Context-free Parsing Algorithm," Communications of the Association for Computing Machinery, Vol. 13, No. 2, p. 94–102, known in the art, and includes some optimizations of the original algorithm, suggested by S. Graham et al., "An Improved Context-free Recognizer," ACM Transactions on Programming Languages and Systems, Vol. 2, No. 3, 1980, p. 415–462. According to Earley's algorithm, in the preferred embodiment the parsing control unit has a main procedure that initializes the machine, writes an initial parsing state into the associative memory unit, and then reads unprocessed states from the CAM and processes them according to one of three actions: PREDICT, COMPLETE, and EXAMINE, to be detailed below. The embodiment is most general, allowing arbitrary context-free grammar rules, including grammar rules with zero right-hand side symbols. In this version, the algorithm uses a number k of "lookahead" symbols equal to zero. Modification of this feature of the algorithm is within the state of current art and may be made by those skilled in the art.

The parsing state representations stored in the associative memory unit are bit patterns arranged into seven fields named "first-word-index", "last-word-index", "rule-number", "dot-position", "left-hand-side" symbol, "symbol-after-dot", and "processed-bit", as shown in FIG. 5. The data in the fifth and sixth fields, "left-hand-side" symbol and "symbol-after-dot", respectively, are redundant, since they may be obtained from the grammar rules stored in the random access memory knowing the "rule-number" and "dot-position" values. However, the operation of retrieving the symbol on the right side of the dot is essential to the three actions of the algorithm, particularly the COMPLETER, and hence the "symbol-after-dot" field is included in the parsing state representations to facilitate and speed up the execution of this operation. Similarly, the inclusion of the fifth field, "left-hand-side" symbol, allows the implementation of an important optimization to the COMPLETER step. A complete behavioral description of the parsing control unit, corresponding to Earley's algorithm with the noted optimizations, appears below in TABLE 1, parts A through G. The first data bus 10 of FIG. 1 is referred to as CAM_BUS in the descriptive code, and the second data bus 11 of the same figure is referred to as D_BUS in the same code. The behavioral description assumes the purely associative memory of FIG. 2, with one data and one mask register, and with three match registers MR1, MR2, and MR3, which may be used for word selection in the CAM operations. The behavioral description of the CAM operation codes assumed by the parsing control unit is given in TABLE 2, below.

The communications unit is connected to the associative memory unit, the random access memory unit, and the parsing control unit through the second internal data bus 11. The CU accesses, through said second internal data bus 11, the finite state parsing control unit for the purposes of initializing it and supplying to it input symbols of the input string to be analyzed. The unit also accesses the CAM at the end of a parsing process for the purpose of reading out and sending to the host processor the parsing state representations and any other information that may be relevant to further processing of the input string. In this embodiment, the communications unit implements a communications protocol for computer peripherals that may be supported by small computers and workstations. This allows the use of the associative processor object of the present invention as an internal or external peripheral device for a wide variety of computers.

The operation of the associative parsing machine, according to the behavioral description of its components given in TABLE 1 and TABLE 2 below, with the grammar of FIG. 3 and for the input string "John thinks $" will now be described with reference to FIG. 6 and FIGS. 7A to 7C.

Figure 6:
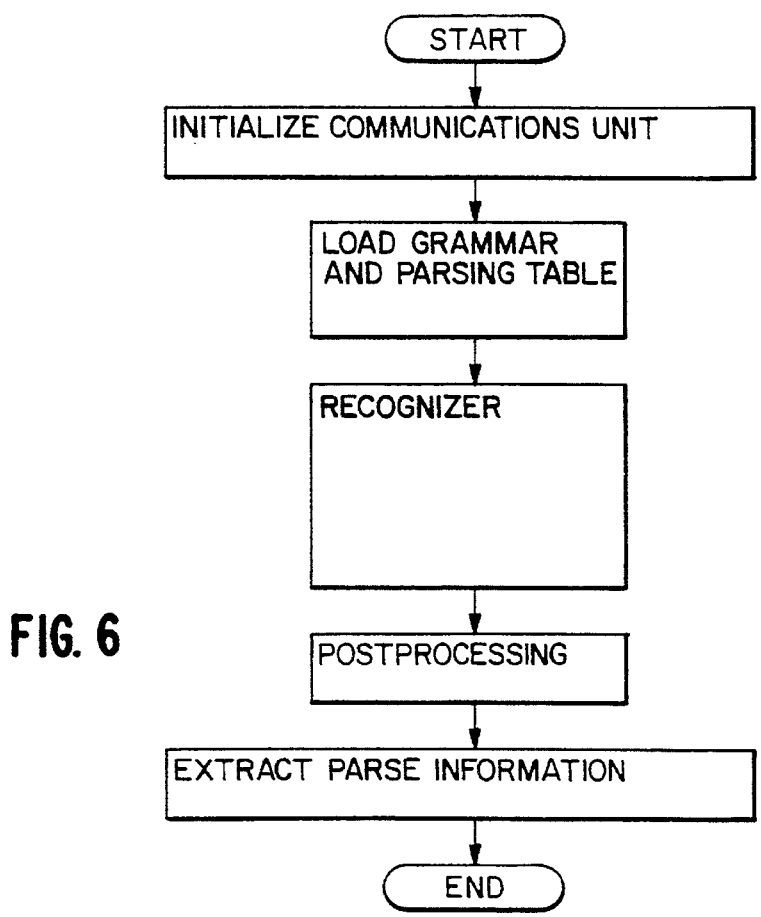
FIG. 6 is a flow chart of the steps followed by the system during loading of a grammar, parsing, and extraction of the parse information.

When the associative parsing machine starts its operation in response to a command from the host processor or external interface, it requires that the parsing grammar, the productions table (P-TABLE), and the nullable symbols table (N-TABLE) have already been loaded into the random access memory. Thus, for the grammar of FIG. 3, the RAM configuration is that shown in FIG. 4. FIG. 6 is a flow chart that shows the general operation of the system, including loading of the analysis grammar, invocation of the main recognizer procedure, execution of optional post-processing actions, and extraction of the parse information.

The parsing control unit of the machine uses an associative memory with one data register DATA_REG, one mask register MASK_REG, and three match registers MR1, MR2, and MR3. M. R1 is used as a general "match" register, MR2 as a temporary "match" register, and MR3 as a "free words" register. The parsing control unit contains three registers CURRENT_SET, INPUT_SYMBOLS, and NEXT_SYMBOL which are used to store the number of the current parsing state set being processed (last-word-index), the number of symbols from the input string already seen, and the next input symbol from the input string. A one bit flag EXIST_SYMBOL is use to indicate that the NEXT_SYMBOL register currently contains the next input symbol from the input string. The parsing control unit also has a data register DR used for storing parsing state representations and a STATUS register with "accept" and "error" fields, into which the result of recognition of the input string is deposited, in the "accept" field of the register. An END_OF_PARSE one bit flag is used to signal the communications unit the end of the parsing process for the input string.

The descriptive code corresponding to the top level of the parsing control unit (RECOGNIZER) is shown in TABLE 1, part A. The code contains steps to initialize the recognizer, write an initial parsing state representation into the CAM, dynamically compute the set of all parsing state representations, and test for acceptance of the input string, depending on the set of parsing states computed. The initialization steps of the recognizer in the code of INITIALIZE_RECOGNIZER, shown in TABLE 1, part B, reset the CURRENT_SET and other registers of the machine, reset the STATUS accept and END_OF_PARSE flags, clear the associative memory, and according to the operation CLEARCAM, in TABLE 1, part G, set the "free words" register MR3 of the CAM, indicating that initially all CAM words are free. Immediately thereafter the parsing control unit assembles and writes into the CAM an initial parsing state representation that corresponds to the application of the production for the initial symbol of the grammar in a top-down derivation. This is shown in the code of WRITE_INITIAL_STATE, also in TABLE 1, part B. This initial parsing sate corresponds to the zero-th production of the grammar in FIG. 3 and has first and last word indices equal to zero, rule number equal to zero, dot position equal to zero, left-had-side symbol equal to the numeric code of Z, symbol-after-dot equal to numeric code of S, and processed-bit mark in zero. The contents of the CAM after insertion of this parsing sate are shown in FIG. 7A.

The principal part of the RECOGNIZER code consists of an iteration cycle in which the CAM is searched for unprocessed parsing states in the current sate set and, if any are found, these are processed, one at a time, according to one of three actions: PREDICT, COMPLETE, and EXAMINE, depending to the type of the symbol found in the "symbol-after-dot" field of the unprocessed parsing sate. PREDICT is applied when the symbol after the dot is a non-terminal symbol, COMPLETE when there is no symbol (i.e., NIL) after the dot, and EXAMINE when the symbol is a terminal symbol. The processing of each sate includes toggling its processed-bit mark to one (i.e., marking it as processed). The descriptive code for the three actions PREDICT, COMPLETE, and EXAMINE is shown in TABLE 1, part C. The descriptive code for the search of unprocessed parsing states from the Current state set appears in the code of MATCH_UNPROCESSED_STATES in TABLE 1, part F.

The first parsing state to be processed by the machine is the initial sate inserted into the CAM, as part of the initialization steps of the RECOGNIZER code. This parsing state is first read from the CAM into register DR of the parsing control unit, and then processed according to the PREDICT operation, since the symbol S found in the "symbol-after-dot" field is a non-terminal symbol. The PREDICT operation first searches the CAM to verify if the "symbol-after-dot" in the state (S in this case) has not already been predicted during processing of the current parsing sate set, and then marks the sate processed by toggling its "processed-bit" field to one and rewriting it into the CAM. If the symbol has been predicted during processing of the current parsing state set no further action is done by the PREDICT operation. Otherwise, the operation seeks grammar rules with the "symbol-after-dot" on the left-hand side and for each one generates a new parsing state representation, to be added to the CAM as unprocessed. The new states are added into the CAM by the operation ADD_STATE, shown in TABLE 1, part D. According to this operation, a new parsing state representation is not added into the CAM if it is already found there, ignoring its "processed-bit". The ADD_STATE operation may also add some additional sates into the CAM, if some symbols after the dot in the original state to be added are nullable. Since in the grammar of FIG. 3 there is only one rule for the symbol S of the initial parsing state representation, and there are no nullable symbols, there is only one new parsing state added into the CAM by the PREDICT operation, and the CAM contents after execution of this operation are the two parsing states shown in FIG. 7B.

After one more iteration in the RECOGNIZER code, in which the production for the NP non-terminal symbol is predicted, the associative processor is ready to apply the EXAMINE operation to the first symbol "John" of the input string. Symbols from the input string are obtained from the communications unit by the GET_INPUT_SYMBOL operation of TABLE 1, part E. If the symbol is not already in the NEXT_SYMBOL register, the operation raises the SYMBOL_REQUEST signal to the communications unit and waits until the unit responds with the SYMBOL_READY signal in the converse direction, at which time the symbol must be present on the data bus 11 (D_BUS) of FIG. 1 and is loaded into the NEXT_SYMBOL register.

The parsing control unit continues operating as made explicit in its behavioral description of TABLE 1, parts A through G, until no parsing states are found unprocessed in the current parsing state set and the value of the CURRENT_SET register is greater than the value in the INPUT_SYMBOLS register. This condition signals the end of the dynamic computation of parsing state representations for the input string read. For the input string "John thinks S", assumed as input to the associative parsing machine, the parsing state representations computed, and hence the contents of the CAM at the end of the iterations of the RECOGNIZER, are shown in FIG. 7C. The last two steps of the of the parsing control unit, as shown in the RECOGNIZER code of TABLE 1, part A, are a test for acceptance of the input string, by searching the CAM for presence of a particular parsing state representation, and to signal the end of the parsing process, by setting the END_OF_PARSE flag to one. The details of the test for acceptance appear in TABLE 1, part F.

Throughout TABLE 1, the interaction between the operation of the parsing control unit and the associative memory unit is done through the operations of TABLE 1, part G. These operations assume the basic operation codes of TABLE 2 for the associative memory unit, and are macro codes that utilize those primitive operations of the associative memory.

Two optimizations of Earley's original algorithm appear in the steps CHECK_IF_ALREADY_PREDICTED and CHECK_IF_ALREADY_COMPLETED of the PREDICT and COMPLETE operations in TABLE 1, part C. The two steps, shown in TABLE 1, part F, help to avoid lengthy computations in which a non-terminal symbol already predicted during computation of the current parsing state set is tried to be predicted again, or a non-terminal symbol already completed from a given parsing state set is tried to be completed again. A third optimization of the algorithm appears in the operation ADD_STATE of TABLE 1, part D. This operation handles in an efficient Way what would otherwise be a series of predict and complete operations on nullable symbols, using the precomputed information on nullable symbols from the N-TABLE.

In addition to the execution of the selected parsing algorithm, the finite state parsing control unit may optionally execute some post-processing operations, such as parse extraction algorithms and useless parsing state marking and elimination algorithms, to simplify further processing of the parsing result by the host processor.

The chief advantage of the associative memory parsing processor over a traditional von Neumann computer is that it reduces the theoretical and practical time complexity of universal parsing algorithms both with respect to grammar size and input string length, in a compact manner. The hardware implementation of the parsing algorithm to be used also contributes significantly to speed of operation. Additionally, when attached to the central processing unit of a standard computer, the associative processor acts as a dedicated parallel processor that frees general computing resources of the host computer for other user inks. An advantage of the associative memory processor over other parallel architectures for the execution of parallel parsing algorithms, such as the systolic array architecture of Chiang and FU, is that the parallel processing element in the associative processor is its associative memory, which is better suited for large scale VLSI implementation, due to its regularity of layout and interconnection patterns and its wide range of applications.

For the purposes of illustration, but not of limitation, in the following TABLE 1, parts A through G, an example behavioral description of the associative processor in accordance with the invention is given. It should be noted by those skilled in the an that the description admits many different structural realizations and that, therefore, in the interest of generality, none such is given.

TABLE 1 part A

Behavioral Description of Parsing Control Unit (PCU): RECOGNIZER
RECOGNIZER:
```
/*  Data register fields DR: < f, i, p, j, lhs, sad, pb>
    CAM MR1: General match register
    CAM MR2: Temporary match register
    CAM MR3: Free words register
    ----------------------------------------------------------------------------------*/
    INITIALIZE_RECOGNIZER;
    WRITE_INITIAL_STATE;
    repeat
        MATCH_UNPROCESSED_STATES;
        while MATCHED_STATES do begin
            READCAM MR1;
            switch CLASSIFY(DR.sad) begin
                NON_TERMINAL:       PREDICT;
                NIL:                COMPLETE;
                TERMINAL:           EXAMINE;
                default:            ERROR(0);
            endswitch;
            MATCH_UNPROCESSED_STATES;
        endwhile;
        CURRENT_SET := CURRENT_SET + 1;
        EXIST_SYMBOL := 0;
    until CURRENT_SET > INPUT_SYMBOLS;
    TEST_ACCEPTANCE;
    END_OF_PARSE := 1;
END.
```

TABLE 1 part B

Behavioral Description of PCU: Initialization routines
```
INTIIALIZE_RECOGNIZER:
    CURRENT_SET := 0;
    INPUT_SYMBOLS := 0;
    EXIST_SYMBOL := 0;
    SYMBOL_REQUEST := 0;
    END_OF_PARSE := 0;
    STATUS.accept := 0;
    STATUS.error[0]:= 0;
    CLEARCAM;
END.
WRITE_INITIAL_STATE:
    DR.f := 0;
    DR.i := 0;
    DR.p := 0;
    DR.j := 0;
    DR.lhs := RULE[0, 0];
    DR.sad := RULE[0, 1];
    DR.pb := 0;
    ADD_STATE;
END.
```

TABLE 1 part C

Behavioral Description of PCU: PREDICT, COMPLETE, EXAMINE
```
PREDICT:
    CHECK_IF_ALREADY_PREDICTED;
    MARK_STATE_PROCESSED;
    if not(MATCHED_STATES) begin
        FIRST_P := P_TABLE[DR.sad];
        LAST_P := P_TABLE[DR.sad + 1];
        DR.f := CURRENT_SET;
        DR.i := CURRENT_SET;
        DR.j := 0;
        DR.lhs := DR.sad;
        repeat
            DR.p := FIRST_P;
```

TABLE 1-continued

```
            DR.sad := RULE[FIRST_P, 1];
            DR.pb := (DR.sad == NIL);
            ADD_STATE;
            FIRST_P := FIRST_P + 1;
        until FIRST_P = LAST_P;
    endif;
END.
COMPLETE:
    CHECK_IF_ALREADY_COMPLETED;
    MARK_STATE_PROCESSED;
    if not(MATCHED_STATES) begin
        DR.i := DR.f;
        DR.sad := DR.lhs;
        MATCHCAM MR1, DR, < 1, 0, 1, 1, 1, 0, 1>;
        while MATCHED_STATES do begin
            READCAM MR1;
            DR.i := CURRENT_SET;
            DR.j := DR.j + 1;
            DR.sad := RULE[DR.p, DR.j + 1];
            DR.pb := 0;
            ADD_STATE;
            SELECTNEXTCAM MR1;
        endwhile;
    endif;
END.
EXAMINE:
    MARK_STATE_PROCESSED;
    GET_INPUT_SYMBOL;
    if DR.sad = NEXT_SYMBOL begin
        DR.i := CURRENT_SET + 1;
        DR.j := DR.j + 1;
        DR.sad := RULE[DR.p, DR.j + 1];
        DR.pb := 0;
        ADD_STATE;
    endif;
END.
```

TABLE 1 part D

Behavioral Description of PCU: ADD_STATE
ADD_STATE;
    WRITESETCAM MR3, DR, < 0, 0, 0, 0, 0, 0, 1>;
    if not(MATCHED_STATES) begin
        repeat
            NULLABLE := N_TABLE[DR.sad];
            if NULLABLE begin
                DR.j := DR.j + 1;
                DR.sad := RULE[DR.p, DR.j + 1];
                WRITESETCAM MR3, DR, < 0, 0,
                  0, 0, 0, 1>;
            endif;
        until not(NULLABLE) OR MATCHED_STATES;
    endif;
END.

TABLE 1 part E

Behavioral Description of PCU:
GET_INPUT_SYMBOL, CLASSIFY
GET_INPUT_SYMBOL:
    if not(EXIST_SYMBOL) begin
        SYMBOL_REQUEST := 1;
        wait on SYMBOL_READY;
        NEXT_SYMBOL := D_BUS;
        SYMBOL_REQUEST := 0;
        EXIST_SYMBOL := 1;
        INPUT_SYMBOLS := INPUT_SYMBOLS + 1;
    endif;
END.
CLASSIFY(SYMBOL):
    /* Assumes an n-bit encoding of 'SYMBOL' as follows
        Start symbol (ZETA):    $2^{(n-1)}$
        Other non-terminals:    $2^{(n-1)},..., 2^n - 1$
        Terminals:    $1,...,2^{(n-1)} - 1$
        End-of-string (NIL):    0
    -----------------------------------------------------------------*/
    NT = SYMBOL[n−1];
    ZERO = not( OR( SYMBOL[n−2],..., SYMBOL[0]));
    if (NT AND ZERO) begin return(ZETA) endif;
    if (NT AND not(ZERO)) begin return(NON_TERMINAL)
    endif;
    if (not(NT) AND not(ZERO)) begin return(TERMINAL)
    endif;
    if (not(NT) AND ZERO) begin return(NIL) endif;
END.

TABLE 1 part F

Behavioral Description of PCU: Other Macros
MATCH_UNPROCESSED_STATES:
    DR.i := CURRENT_SET;
    DR.pb := 0;
    MATCHCAM MR1, DR, < 1, 0, 1, 1, 1, 1, 0>;
END.
MARK_STATE_PROCESSED:
    DR.pb := 1;
    WRITECAM MR1, DR;
END.
CHECK_IF_ALREADY_PREDICTED:
    DR.pb := 1;
    MATCHCAM MR2, DR, < 1, 0, 1, 1, 1, 0, 0>;

TABLE 1-continued

END.
CHECK_IF_ALREADY_COMPLETED:
    DR.pb := 1;
    MATCHCAM MR2, DR, < 0, 0, 1, 1, 0, 0, 0>;
END.
ERROR(i):
    STATUS.error[i] := 1;
END.
TEST_ACCEPTANCE:
    DR.f := 0;
    DR.i := INPUT_SYMBOLS;
    DR.p := 0;
    DR.j := 2;
    MATCHCAM MR2, DR, < 0, 0, 0, 0, 1, 1, 1>;
    STATUS.accept := MATCHED_STATES;
END.

TABLE 1 part G

Behavioral Description of PCU: CAM Macros
These macros are expanded into primitive CAM operation codes,
with the following usage of the three match registers:
MR1 = match register, MR2 = temporary match register,
MR3 = free words register.
CLEARCAM:
    CLEAR;
    SETREG MR3;
END.
READCAM REG:
    READ REG;
    DR := CAM_BUS;
END.
WRITECAM REG, DATA:
    CAM_BUS = DATA;
    WRITE REG;
END.
SELECTNEXTCAM REG:
    SELECTNEXT REG;
    MATCHED_STATES := MATCHFLAG;
END.
MATCHCAM REG. DATA,,MASK:
    CAM_BUS = MASK;
    LOADMASK;
    CAM_BUS = DATA;
    MATCH REG;
    MOVEREG REG, (REG AND not(MR3));
    MATCHED_STATES := MATCHFLAG;
END.
WRITESETCAM REG, DATA, MASK:
    CAM_BUS = MASK;
    LOADMASK;
    CAM_BUS = DATA;
    MATCH MR2;
    MOVEREG MR2, (MR2 AND not(MR3));
    MATCHED_STATES := MATCHFLAG;
    if not(MATCHFLAG) begin
        WRITE REG;
        SELECTNEXT REG;
    endif;
END.

Also, for the purposes of illustration, but not of limitation, in the following TABLE 2, a behavioral description of the CAM operation codes assumed by the parsing control unit is given.

TABLE 2

Behavioral Description of CAM Operation Codes
```
/*      CAM registers: DATA_REG, MASK_REG, MR1, MR2, MR3
        CAM width:    WCAM (bits per word)
        CAM height:   HCAM (number of words)
        CAM[i] is the i-th CAM word, for i = 1, ..., HCAM
-----------------------------------------------------------------------*/
CLEAR:
        DATA_REG := 0;
        MASK_REG := 0;      /* MASK register: "0" don't mask; "1" mask      */
        MR1[i] := 0:        /* MATCH register 1, for i = 1, ..., HCAM       */
        MR2[i] := 0;        /* MATCH register 2, for i = 1, ..., HCAM       */
        MR3[i] := 0;        /* MATCH register 3, for i = 1, ..., HCAM       */
END.
READ REG:                                 /* REG = MR1, MR2, or MR3        */
        DATA_REG := CAM[PRIORITY[REG]];
        CAM_BUS = DATA_REG;
END.
WRITE REG:                                /* REG = MR1, MR2, or MR3        */
        DATA_REG := CAM_BUS;
        CAM[PRIORITY[REG]] := DATA_REG;
END.
SELECTNEXT REG:                           /* REG = MR1, MR2, or MR3        */
        REG := SELECT_NEXT(REG);          /* resets LSB of REG set to "1"  */
        MATCHFLAG := OR(REG[1], ..., REG[HCAM];
END.
LOADMASK:
        MASK_REG := CAM_BUS
END.
SETREG REG:                               /* REG = MR1, MR2, or MR3        */
        REG[i] := 1;                      /* for i = 1, ..., HCAM          */
END.
RESETREG REG:                             /* REG = MR1, MR2, or MR3        */
        REG[i] := 0;                      /* for i = 1, ..., HCAM          */
END.
MOVEREG REG, expression:                  /* REG = MR1, MR2, or MR3        */
                                          /* expression: register, Boolean */
        REG[i] := expression[i];          /* for i = 1, ..., HCAM          */
        MATCHFLAG := OR(REG[1], ..., REG[HCAM]);
END.
MATCH REG:                                /* REG = MR1, MR2, or MR3        */
        DATA_REG := CAM_BUS;
        SEARCH_PATTERN = DATA_REG * MASK_REG;
        MLINE[i] = MATCH(CAM[i], SEARCH_PATTERN);
        MATCHFLAG := OR(MLINE[1], ..., MLINE[HCAM]);
        REG[i] := MLINE[i];               /* for i = 1, ..., HCAM          */
END.
```

While this invention has been shown particularly and described with reference to a preferred embodiment, it shall be understood by those skilled in the art that numerous modifications may be made in form and details of the architecture, in the choice of the parsing algorithm to be used, and in the particular embodiment of said algorithm, that are within the scope and spirit of the inventive contribution, as defined by the appended claims. For example, the associative memory unit has been shown with a particular organization and set of operation codes it can execute, but this does not preclude the use of other associative memory means that can implement the required operations. Likewise, different arrangements in the number and nature of the control signals used to interconnect the system components are possible. Variations and optimizations in the choice of the parsing algorithm are possible, which may affect the time and space complexity of the device. Some of the optimizations referred to may require minor changes to the architecture of the preferred embodiment, such as the inclusion of additional tables for the parsing process. One such optimization worth noting is the inclusion of a table or other means in the random access memory to store the relation FIRST$_k$ between non-terminal and terminal symbols, to avoid useless predictions.

Finally, the behavioral description of the parsing control unit shown in Table 1, corresponding to the particular parsing algorithm chosen, or any other alternative one, admits of many distinct physical realizations, such as may be obtained by manual transformation of the specification into structural, logical, electrical, and geometrical levels of description, or as the same descriptions may be obtained by means of automated synthesis tools for silicon compilation.

What is claimed is:

1. A method of executing parsing algorithms on an associative memory processing system against a given grammar and input string, the grammar being comprised of a plurality of grammar rules, each of which has one left-hand side symbol, and zero or more right-hand side symbols, said method comprising the steps of:

storing a plurality of grammar rules in a memory, according to numeric codes for the symbols of each grammar rule, and in an order of the grammar rules;

defining a predetermined parsing algorithm, and a numeric encoding of each of the parsing states used by the parsing algorithm, so that each such encoding, referred to as a parsing state representation, may be stored in one associative memory word so as to allow retrieval by multiple access patterns;

storing the parsing state representations generated by the algorithm in the associative memory means, and distinguishing unprocessed parsing states from those parsing states already processed by the algorithm;

accessing the associative memory means with a first retrieval condition for retrieval of unprocessed parsing states;

using parsing control means for the processing of unprocessed parsing states retrieved from the associative memory means, such processing including marking the current unprocessed parsing state as processed, and yielding potentially new unprocessed parsing states;

accessing the associative memory means with a second retrieval condition for testing the presence of a potentially new unprocessed parsing state in the associative memory, and if such is the case, inhibiting the writing of the potentially new unprocessed parsing state into the associative memory; and accessing the associative memory means with further retrieval conditions for retrieving parsing states that meet certain criteria, required for processing of unprocessed parsing states and for optimizations of the processing to be performed.

2. The method of executing parsing algorithms as claimed in claim 1, wherein each retrieval from the associative memory means is performed in a parallel manner, in an amount of time which is independent of the number of parsing state representations stored in the associative memory means.

3. The method of claim 1, further comprising the step of ordering the grammar rules in the memory according to the left-hand symbol.

4. The method of claim 1, further comprising the step of assigning a unique numeric code to each grammar symbol and a separate numeric code to each grammatical rule according to an order selected for grammatical rules.

* * * * *